C. Garver.
Horse Rake.
No. 3,522 Reissued Jun. 29, 1869.
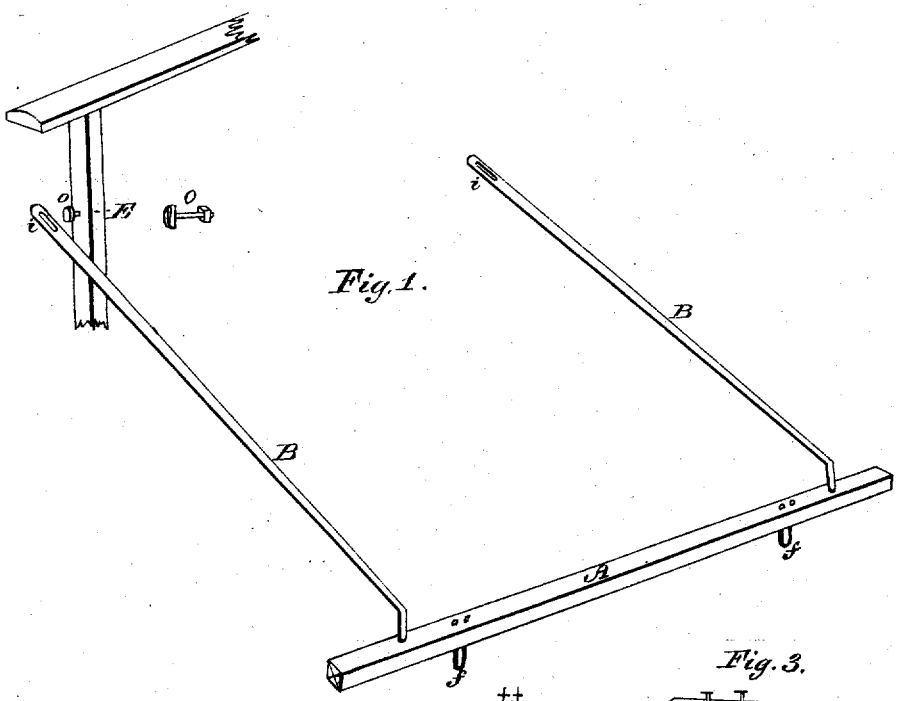
Fig. 1.
Fig 4.
Fig. 3.
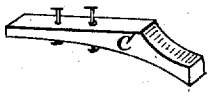
Fig 2.
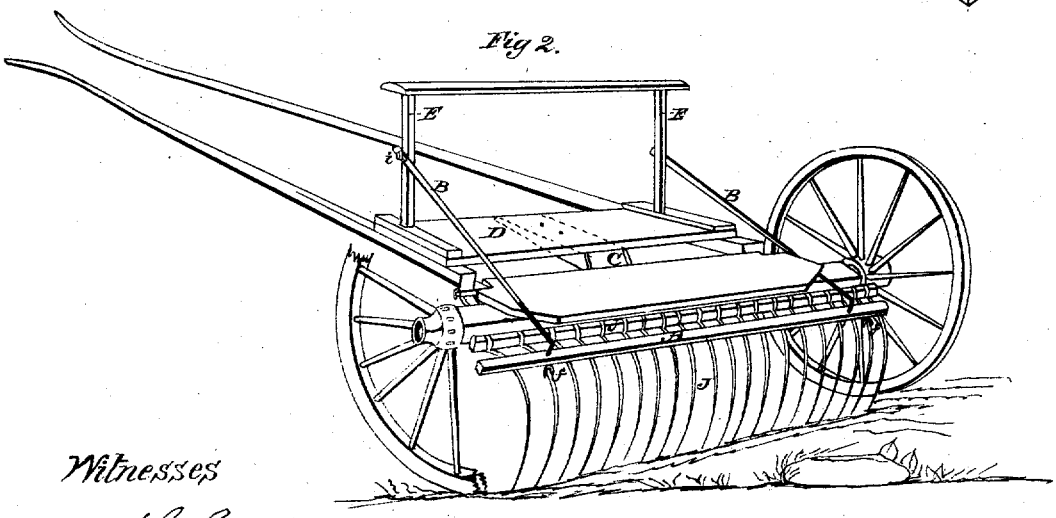
Witnesses
J. H. Brinser
John W. Hiper.
Inventor:
Christian Garver.

UNITED STATES PATENT OFFICE.

CHRISTIAN GARVER, OF MIDDLETOWN, PENNSYLVANIA.

IMPROVEMENT IN HORSE-RAKES.

Specification forming part of Letters Patent No. 22,232, dated December 7, 1858; Reissue No. 3,522, dated June 29, 1869.

*To all whom it may concern:*

Be it known that I, CHRISTIAN GARVER, of Middletown, in the county of Dauphin and State of Pennsylvania, have invented a new and Improved Horse Hay-Rake; and I do hereby declare that the following is a full, clear, and exact description of the construction and operation of the same, reference being had to the accompanying drawings, making a part of this specification, in which—

Figure 1 is a detached perspective view of the cleaner. Fig. 2 is a similar view of the rake with the cleaner attached. Fig. 3 is a similar view of the stop-block. Fig. 4 is a view of the staple that connects the cleaning-bar with the teeth.

The object of this invention is to construct a neat, light, cheap, and effective attachment to horse hay-rakes, which shall prevent the teeth from clogging with hay, sticks, &c., and shall cause the rake, every time that the teeth are lifted, to discharge all the hay that has been gathered by it.

In the drawings, T T are the thills, M M the wheels, N the axle, and J the teeth, of a common horse hay-rake. Attached to the thills are two upright standards, E E, surmounted by a cross-bar to steady and strengthen them. A light cleaning-bar, A, rests upon the upper side of the teeth, near the rake-head, and is held in contact with the teeth by a staple, *f*, near each end, which embraces one of the teeth, as shown in Fig. 2.

To the cleaning-bar A are attached two arms, B B, which are pivoted to the uprights E E by means of an oblong slot, *i*, and headed pin *o*, in the manner clearly seen in Figs. 1 and 2, so that, as the cleaning-bar is raised and lowered, the arms B B attached to it are capable of a slight longitudinal motion upon their pivot-pin.

C is a stop-block attached to the under side of the platform D, and having its rear end curved downward in the shape represented in Fig. 3. This end of the block comes in contact with the axle or rake-head, and prevents the rake-teeth from accidentally swinging too far forward under the axle. The operation of the cleaning-bar A is to slide along from the rake-head toward the points of the teeth, and in contact with their upper side whenever the rake is elevated to discharge its load, thereby scraping from the teeth and removing all the hay they have collected. When the rake is lowered again the cleaning-bar slides back to its place.

The jointed rods or arms B B hold the bar in the proper position in relation to the teeth, and at the same time enable it to rise and fall with them. In this respect the device differs from every other heretofore used for a similar purpose, and by virtue of this difference it can be made lighter and neater in appearance than any other, while at the same time it operates more effectually than the cumbersome and awkward apparatus which have been hitherto employed.

Having thus described my invention, what I claim as new, and desire to secure by Letters Patent, is—

1. A cleaning-bar, A, lying across the rake-teeth, and so constructed and operating that the raising of the teeth causes it to scrape the hay from the rake-head toward the points of the teeth, while the lowering of the rake-teeth brings it back to its original position.

2. A cleaning-bar, A, constructed with arms B B, and swinging on a pivot, *o*, substantially as described.

3. The arrangement of the cross-piece A, staples *f*, parallel arms B, slots *i*, and pins O, with rake J, in the manner and for the purpose herein specified.

CHRISTIAN GARVER.

Witnesses:

WILLIAM GOTSHALE,

L. F. STEINMETZ.